United States Patent
Tan et al.

(10) Patent No.: US 9,774,743 B2
(45) Date of Patent: Sep. 26, 2017

(54) SILENCE SIGNATURES OF AUDIO SIGNALS

(71) Applicant: Hewlett-Packard Development Company, L.P., Houston, TX (US)

(72) Inventors: Wai-Tian Tan, Sunnyvale, CA (US); Ramin Samadani, Palo Alto, CA (US); Mary G. Baker, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

(21) Appl. No.: 14/758,992

(22) PCT Filed: Mar. 29, 2013

(86) PCT No.: PCT/US2013/034661
§ 371 (c)(1),
(2) Date: Jul. 2, 2015

(87) PCT Pub. No.: WO2014/158193
PCT Pub. Date: Oct. 2, 2014

(65) Prior Publication Data
US 2016/0088160 A1    Mar. 24, 2016

(51) Int. Cl.
*H04M 3/42* (2006.01)
*H04M 3/56* (2006.01)
*G10L 25/78* (2013.01)

(52) U.S. Cl.
CPC .............. *H04M 3/568* (2013.01); *G10L 25/78* (2013.01); *H04M 2203/352* (2013.01)

(58) Field of Classification Search
CPC .......................... H04M 3/56; H04L 29/08108

USPC ..................... 455/416, 3.06, 414.4
See application file for complete search history.

(56) References Cited

U.S. PATENT DOCUMENTS

| | | | |
|---|---|---|---|
| 6,633,632 B1 | 10/2003 | Harlow et al. | |
| 8,315,619 B1 | 11/2012 | Nunally | |
| 2007/0154032 A1* | 7/2007 | Kawamura | G10L 25/78 381/94.1 |
| 2011/0289224 A1 | 11/2011 | Trott | |
| 2012/0142378 A1 | 6/2012 | Kim et al. | |
| 2012/0254240 A1* | 10/2012 | Mariotti | H04W 4/206 707/770 |
| 2012/0263019 A1 | 10/2012 | Armstong-Muntner | |
| 2013/0006622 A1 | 1/2013 | Khalil et al. | |

FOREIGN PATENT DOCUMENTS

| | | |
|---|---|---|
| WO | WO-2007064641 | 6/2007 |
| WO | WO-2011090411 | 7/2011 |

OTHER PUBLICATIONS chirp.io—Let's teach the machines to sing, http://chirp.io/home-sp2/?utm_expid=59931116-3.

(Continued)

*Primary Examiner* — Chuck Huynh
(74) *Attorney, Agent, or Firm* — HP Inc. Patent Department

(57) ABSTRACT

A method performed by a processing system. The method includes generating silence signatures of audio signals from a plurality of device based on energy levels of the audio signals, providing the silence signatures to an interaction service, and out-putting interaction information corresponding to the devices.

12 Claims, 9 Drawing Sheets

(56) References Cited

OTHER PUBLICATIONS

Guedes, F. et al., Co-location of Mobile Devices with Audio and Wireless Interfaces, Jul. 10, 2008.

International Search Report and Written Opinion, dated Dec. 27, 2013, PCT Application No. PCT/US2013/034661, 11 Pages.

Tan, Wai-Tian, et al. Determining Co-Location Using a Sequential Hypothesis Test on Patterns of Silence, Mobile and Immersive Experience Lab, Hewlett Packard Labs, Palo Alto, CA, 5 Pages.

Tan, Wai-Tian, et al., The Sound of Silence, Mobile and Immersive Experience Lab, Hewlett-Packard Laboratories, Palo Alto, CA, 14 Pages.

Varshavsky, A. et al., Amigo: Proximity-based Authentication of Mobile Devices, Proceedings of the 9th international conference on Ubiquitous computing, Mar. 10, 2007, pp. 253-270.

\* cited by examiner

SILENCE SIGNATURES OF AUDIO SIGNALS

CROSS-REFERENCE TO RELATED APPLICATION

This application is a U.S. National Stage Application of and claims priority to International Patent Application No. PCT/US2013/034661, filed on Mar. 29, 2013, and entitled "SILENCE SIGNATURES OF AUDIO SIGNALS."

BACKGROUND

Collaborative communication between different parties is an important part of today's world. People meet with each other on a daily basis by necessity and by choice, formally and informally, in person and remotely. There are different kinds of meetings that can have very different characteristics. In any meeting, an effective communication between the different parties is one of the main keys for success. Sometimes, a meeting has a collaborative purpose that results in a shared content, a recorded consensus, or a group action. In other situations, there is no pre-planned purpose for the meeting, but the participants may still value the discussion and would like to refer back to it and have a record of who was present at the meeting.

DETAILED DESCRIPTION

Figure 1:
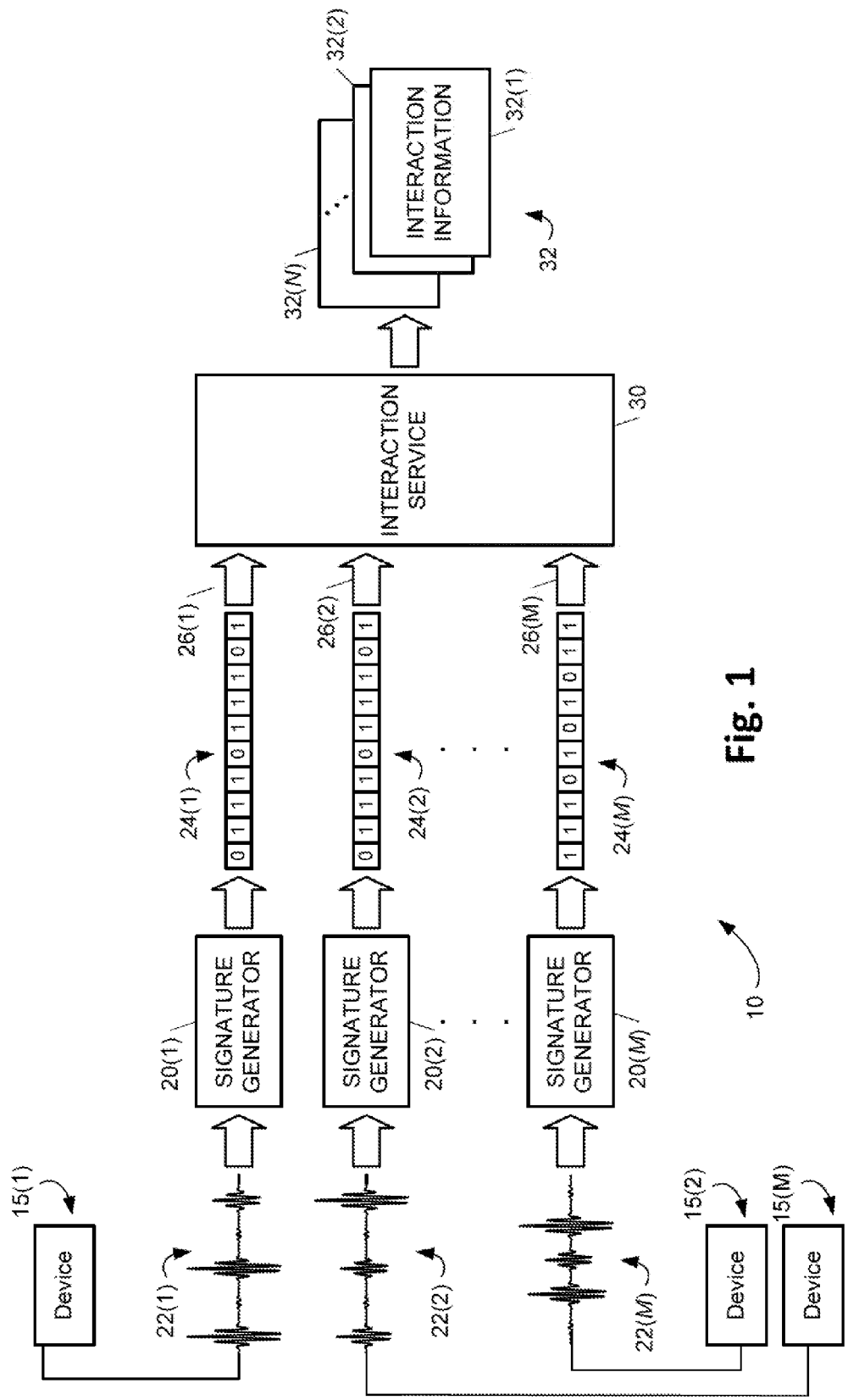
FIG. 1 is a schematic diagram illustrating an example of a processing environment with a processing system that generates a silence signature of an audio signal, provides the silence signature to an interaction service, and outputs interaction information corresponding to the device from the interaction service.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

As used herein, the terms "wireless device" and "mobile device" may be used interchangeably and refer to any one of various smart-phones (e.g., Samsung Galaxy®), cellular telephones, tablets, (e.g., iPAD®), laptop computers, personal data assistants (PDA's), VoIP phones, wireless enabled televisions, wireless enabled entertainment systems, and other similar electronic devices that include a processor and are capable of sending and receiving wireless or wired communication signals.

As used herein, the term "communication interface" refers to various protocols available to any of the wireless devices to communicate with each other and with a network. In particular, the communications interface may include Wi-Fi, Bluetooth, 3G, 4G, and any other comparable communications interfaces.

Communication technologies, both wireless and wired, have seen dramatic improvements over the past years. A large number of the people who participate in meetings today carry at least one mobile device, where the device is equipped with a diverse set of communication or radio interfaces. Through these interfaces, the mobile device can establish communications with the devices of other users, a central processing system, reach the Internet, or access various data services through wireless or wired networks.

One important characteristic for the success of any meeting is the ability to automatically determine the group of members in the meeting. In other words, it is beneficial to identify all participants in a meeting that share the same co-location. The co-location may be physical (when all participants are in the same room) or virtual (where the participants are at different physical locations but are part of the same meeting). Automatically identifying the group of meeting members that share the same co-location has many advantages. For example, if the group of meeting members dynamically changes, identifying the current members can enable easier content sharing between all the attendees. During the meeting, another member can be added seamlessly without painful interruptions for setup. In addition, digital business card information can be automatically exchanged between the members and information about the members can be automatically inserted into calendar applications to simplify scheduling of follow-up meetings. Further, identifying the group members that have the same co-location allows for automatic population the membership of collaborative editing applications, mailing lists, and social networks. This feature also allows determining when a physical location (i.e., a meeting room) is available (i.e., when there are no people inside), and enables just-in-time conference room scheduling.

This description proposes using audio sensing of a user's device to determine co-location (i.e., physical or virtual) for a group of meeting members. In particular, the description is directed to a processing system, a non-transitory machine-readable storage medium, and methods that use silence signatures of audio signals from a plurality of device to output interaction information about the devices and to determine co-location of the plurality of devices and subsequently of their users.

Meetings almost always involve people talking. Therefore, audio sensing offers a useful way to determine the group of members in the meeting, where each member brings his or her mobile device to the meeting. Generally, almost all mobile devices include microphones, and hearing the same conversation provides a human-centric notion of attending the same gathering. The audio signal captured by a mobile device reflects the presence of walls and other sound barriers between otherwise closely situated people, allowing separation of people who while physically close are not part of the same meeting. Analysis of this audio signal allows sensing participants of a meeting who attend remotely by teleconference. Using audio sensing to determine co-location does not require attendees to perform any explicit action when joining a meeting or leaving a highly sensitive meeting for which they should no longer have access to associated content.

Specifically, the description proposes using a particular kind of audio sensing and comparing patterns of relative audio silence (i.e., silence signatures) of audio signals from devices carried by users attending a meeting. It is to be understood that in this description relative silence in audio can be referred to as silence. Instead of attacking the difficult problem of determining if two sounds come from the same source, the description exploits the ubiquity of personal mobile devices and uses these devices to determine co-location based on the time signature of the silences they sense. In one example, audio silence is identified as no sound at all, or a speech silence, although a constant loud hum as part of the ambience is considered silence as well.

As described herein, a method performed by a processing system (e.g., a smartphone, tablet, laptop, etc.) proposes generating a silence signature of an audio signal from a device based on an energy level of the audio signal. As described in additional detail below, the silence signature is generated by using a dynamic silence threshold for a plurality of time intervals during a predetermined time window of the audio signal. The method further includes providing the silence signature to an interaction service using a network connection and outputting interaction information corresponding to the device from the interaction service.

Further, the proposed method evaluates a plurality of silence signatures of audio signals generated by a plurality of devices, where the silence signatures are based on an energy level of the audio signals. The method provides information that the devices are co-located or establishes an interconnection between the plurality of devices when the silence signatures of the devices substantially match. The method also terminates the interconnection between at least one of the devices and the plurality of devices when the silence signature of the one device no longer substantially matches the silence signature of the other of devices (e.g., when a participant leaves a meeting).

There are many advantages to determining the co-location of the group of members in a meeting by analyzing silence signatures of their devices. Silence signatures are robust to acoustic (e.g., different locations within a room) and hardware (e.g., different characteristics of microphones) differences of the devices and can be calculated using existing hardware on essentially all mobile devices. The silence signatures are also not sensitive to moderate temporal misalignment of signals between devices (i.e., when there are different distances from sound sources to the devices). Further, the proposed silence signatures are generally fraction of the size (e.g., one seventh) of sound signatures and they are more private, since they send only silence patterns without otherwise conveying the shape of conversational data. Using silence signatures does not require specific action form a user to be removed from the meeting when he or she leaves the meeting.

FIG. 1 is a schematic diagram illustrating an example of a processing environment 10 with a processing system or device 15(1) that generates a silence signature 24(1) of an audio signal 22(1) from the device 15(1) by using a signature generator 20(1), provides the silence signature 24(1) to an interaction service 30, and outputs interaction information 32 corresponding to the device from the interaction service. In one example, the processing system 15(1) is a smartphone but it can also be any other wireless or wired device. The processing environment 10 may include any number of processing systems or devices 15(2)-15(M). For example, device 15(2) can be a laptop and device 15(M) can be a tablet. These processing systems 15(2)-15(M) also generate silence signatures 24(2)-24(M) of audio signals 22(2)-22(M) from the devices by using signature generators 20(2)-20(M), provide the silence signatures 24(2)-24(M) to the interaction service 30 and outputs interaction information 32(2)-32(N).

The processing system 15(1) communicates with the interaction service 30 using network connection 26(1). The other processing systems 15(2)-15(M) provide the generated silence signatures 24(2)-24(M) to the interaction service 30 using network connections 26(2)-26(M) respectively. In one example, all processing systems in the processing environment 10 communicate with the interaction 30 via the same network connections. In another example, the processing systems can communicate with each other by using the illustrated network connections.

The network connections 26(1)-26(M) include any suitable type, number, and/or configuration of network and/or port devices or connections configured to allow processing system 15(1) and devices 15(2) and 15(M), respectively, to communicate with the device interaction service 30. The devices and the connections may operate according to any suitable networking and/or port protocols to allow information to be transmitted by processing system 15(1) and devices 15(2) and 15(M) to the interaction service 30 and received by processing system 15(1) and devices 15(2) and 15(M) from the interaction service 30. For example, the network connections may include wide area network ("WAN") (e.g., a TCP/IP based network, a cellular network, etc.), a local area network ("LAN"), a neighborhood area network ("NAN"), a home area network ("HAN"), a personal area network ("PAN"), a public switched telephone network ("PSTN"), an Intranet, the Internet, or any other suitable networks.

The audio signals 22(1)-22(M) are the signals captured by microphones (not shown) of the devices 15(1)-15(M) that are processed by the signature generators 20(1)-20(M) to generate silence signatures 24(1)-24(M) based on each audio signal. As described in additional detail below, the silence signatures are used to generate interaction information for the devices 14(1)-15(M) and co-location between the devices can be established when the silence signatures of the devices substantially match.

The following paragraphs will primarily describe the operation of environment 10 from the perspective of processing system 15(1). The functions described with reference to processing system 15(1) may also be performed by devices 15(2) and 15(M) and other suitable devices (not shown) in other examples. As used herein, the terms processing system and device are used interchangeably such that processing system 15(1) may also be referred to device 15(1) and devices 15(2) and 15(M) may also be referred to as processing systems 15(2) and 15(M). The type and arrangement of the devices 15(1)-15(M) as shown in FIG. 1 is only shown one example, and many other types and arrangements of devices may be used in other examples.

Each of processing system 15(1) and devices 15(2) and 15(M) may be implemented using any suitable type of processing system with at least one processor configured to execute computer-readable instructions stored in a memory system where the memory system includes any suitable type, number, and configuration of volatile or non-volatile machine-readable storage media configured to store instructions and data. Examples of machine-readable storage media in the memory system include hard disk drives, random access memory (RAM), read only memory (ROM), flash memory drives and cards, and other suitable types of magnetic and/or optical disks.

Software stored on the machine-readable storage media and executed by the processor of the processing systems include, for example, firmware, applications, program data, filters, rules, program modules, and other executable instructions. Control unit (not shown) of the processor is configured to retrieve from the machine-readable storage media and execute, among other things, instructions related to the control processes and methods described herein.

The software stored on machine-readable storage media and executed by the processors of the processing systems 15(1)-15(M) includes the signature generators 20(1)-20(M). As described in additional detail below, the signature generators 20(1)-20(M) generate silence signatures 24(1)-24(M) based on each audio signals 22(1)-22(M) from the devices 15(1)-15(M).

The interaction service 30 is software stored on machine-readable storage media and executed by a processor. In one example, the interaction service 30 is stored on machine-readable storage media of an independent computing or processing device (e.g., a server, desktop laptop, etc., not shown) connected to the processing system 15(1) and devices 15(2)-15(M). In another example, the interaction service 30 is stored on machine-readable storage media of the one of the processing systems or devices 15(1)-15(M).

As noted above, the interaction service 30 communicates with processing system 15(1) and devices 15(2) and 15(M) using network connections 26(1), 26(2), and 26(M), respectively. The interaction service 30 receives the silence signatures generated by the devices 15(1)-15(M) and can analyze (e.g., compare) the signatures. The interaction service 30 outputs interaction information 32 corresponding to the devices. The interaction service 30 may also store and or access silence signatures and other information concerning processing system 15(1) and devices 15(2) and 15(M) and or users processing system 15(1) and devices 15(2) and 15(M) such as user profiles, device names, device models, and Internet Protocol (IP) addresses of processing system 15(1) and devices 15(2) and 15(M).

An example of the operation of the processing system 15(1) in generating interaction information related to the device 15(1) is now described with reference to the method shown in FIG. 2. The generated interaction information can enable functionalities that produce interactions between the processing system 15(1) and devices 15(2) and 15(M) (e.g., create a group, share email addresses, share content, etc.).

Figure 2:
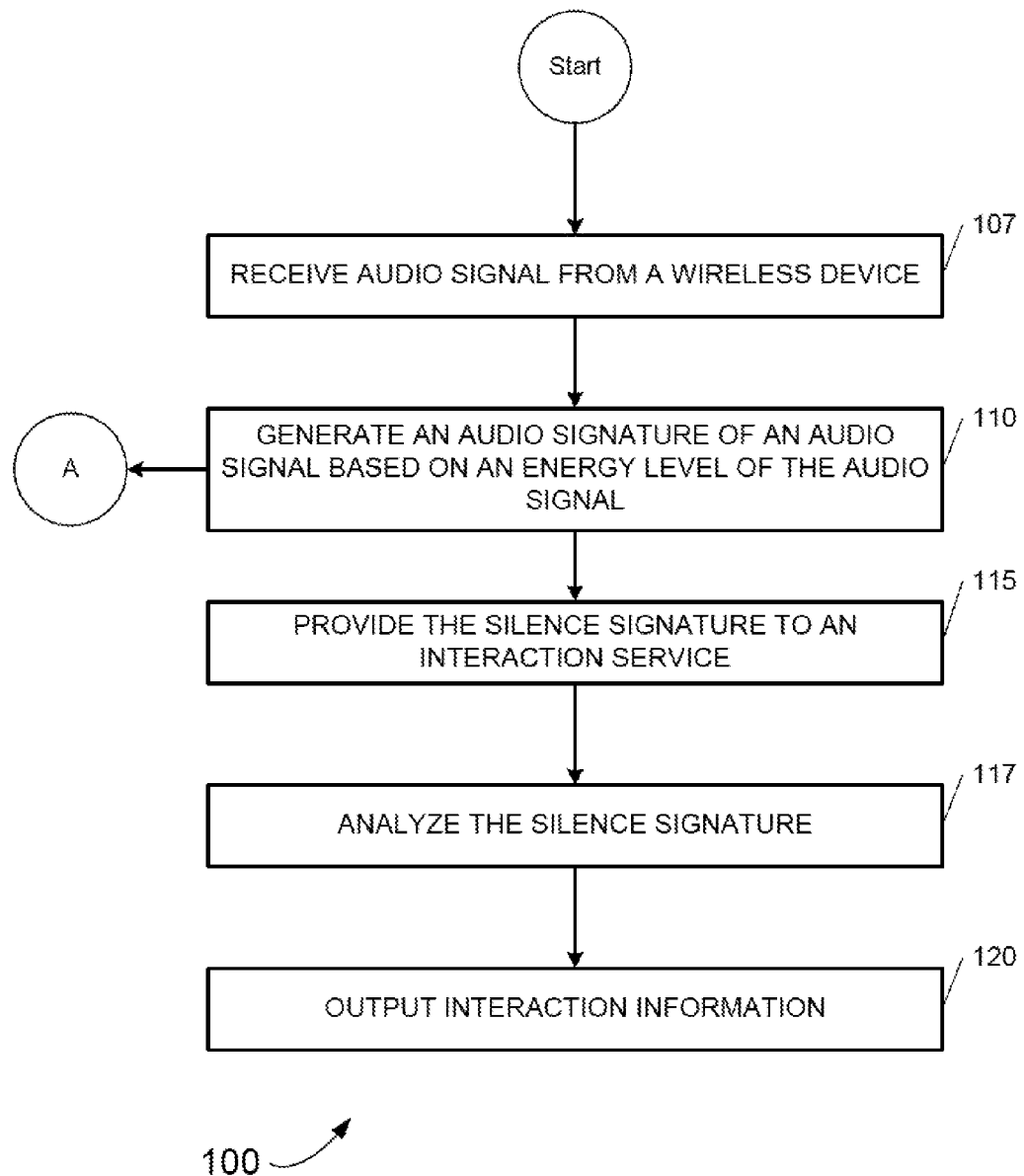
FIG. 2 illustrates a flow chart showing an example of a method for outputting interaction information corresponding to a device.

FIG. 2 illustrates a flow chart showing an example of a method 100 for outputting interaction information corresponding to a device. The method 100 can be executed by a processor of the processing system 15(1). Various steps described herein with respect to the method 100 are capable of being executed simultaneously, in parallel, or in an order that differs from the illustrated serial manner of execution. The method 100 is also capable of being executed using additional or fewer steps than are shown in the illustrated example.

The method 100 begins in step 107, where the signature generator 20(1) receives the audio signal 22(1) from the wireless device 15(1). In one example, the device 15(1) is positioned at a specific location (e.g., a meeting room, vehicle, home, etc.). The device 15(1) includes a microphone that records a window of speech (i.e., audio signal). In one example, the audio signal 22(1) includes a portion of speech recorded by the microphone and any ambient noise for that window. Next, at step 110, the signature generator 20(1) generates a silence signature 24(1) of the audio signal 22(1) based on the energy level (e.g., either the raw energy level or the log energy level) of the audio signal 22(1). The specific process for generating the silence signature 24(1) is described in relation to FIG. 3.

At step 115, the signature generator 20(1) provides the silence signature 24(1) to the interaction service 30. As mentioned above, in one example, the silence signature 24(1) is sent via the network connection 26(1). In other examples (e.g., where the signature is transferred at a later time for forensic purposes), the silence signature 24(1) is transferred by using a Universal Serial Bus (USB) drive (not shown) or by any other type of data transfer device. Next, at step 117, the interaction service 38 analyzes the provided silence signature 24(1). For example, the interaction service 30 can compare the silence signature 24(1) with silence signatures from other devices to determine co-location of the devices and to establish interconnection between the participants in a meeting.

At step 120, the interaction service outputs interaction information corresponding to the device 15(1). In one example, the interaction information can include an IP address of the device 15(1), email address associated with a user, location of the device, contact information of the user, content associated with the device, link to a website, and any other suitable information related to the device 15(1) that allows a commonality of data exchange to occur. The outputted interaction information can enable functionalities that produce interactions between the processing system 15(1) and devices 15(2), 15(M), and other devices or systems (not shown).

Figure 3:
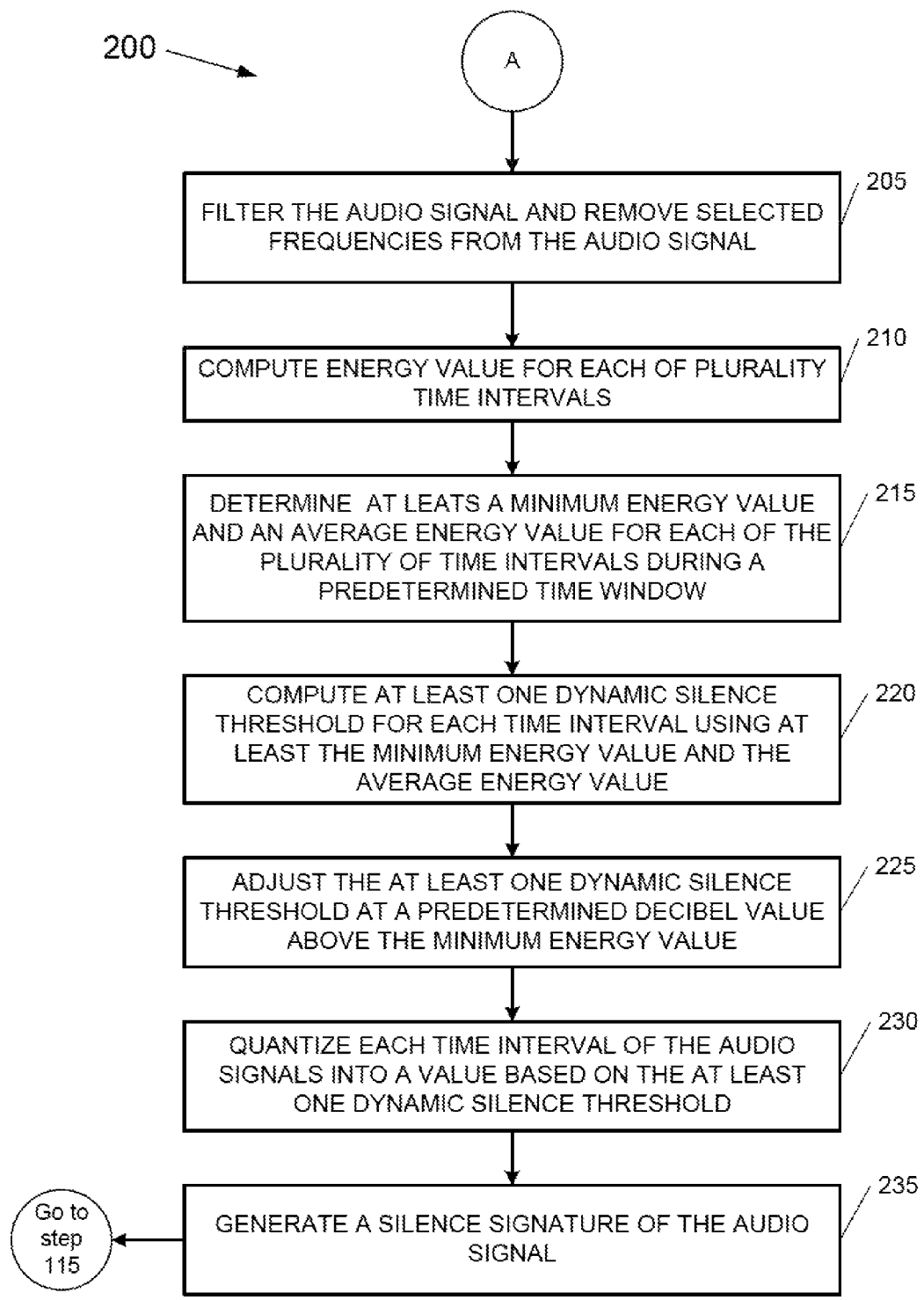
FIG. 3 illustrates a flow chart showing an example of a method for generating a silence signature of an audio signal.

FIG. 3 illustrates a flow chart showing an example of a method 200 for generating a silence signature of an audio signal. The method 200 can be executed by a processor of the processing system 15(1). Various steps described herein with respect to the method 200 are capable of being executed simultaneously, in parallel, or in an order that differs from the illustrated serial manner of execution. The method 200 is also capable of being executed using additional or fewer steps than are shown in the illustrated example.

Figure 4:
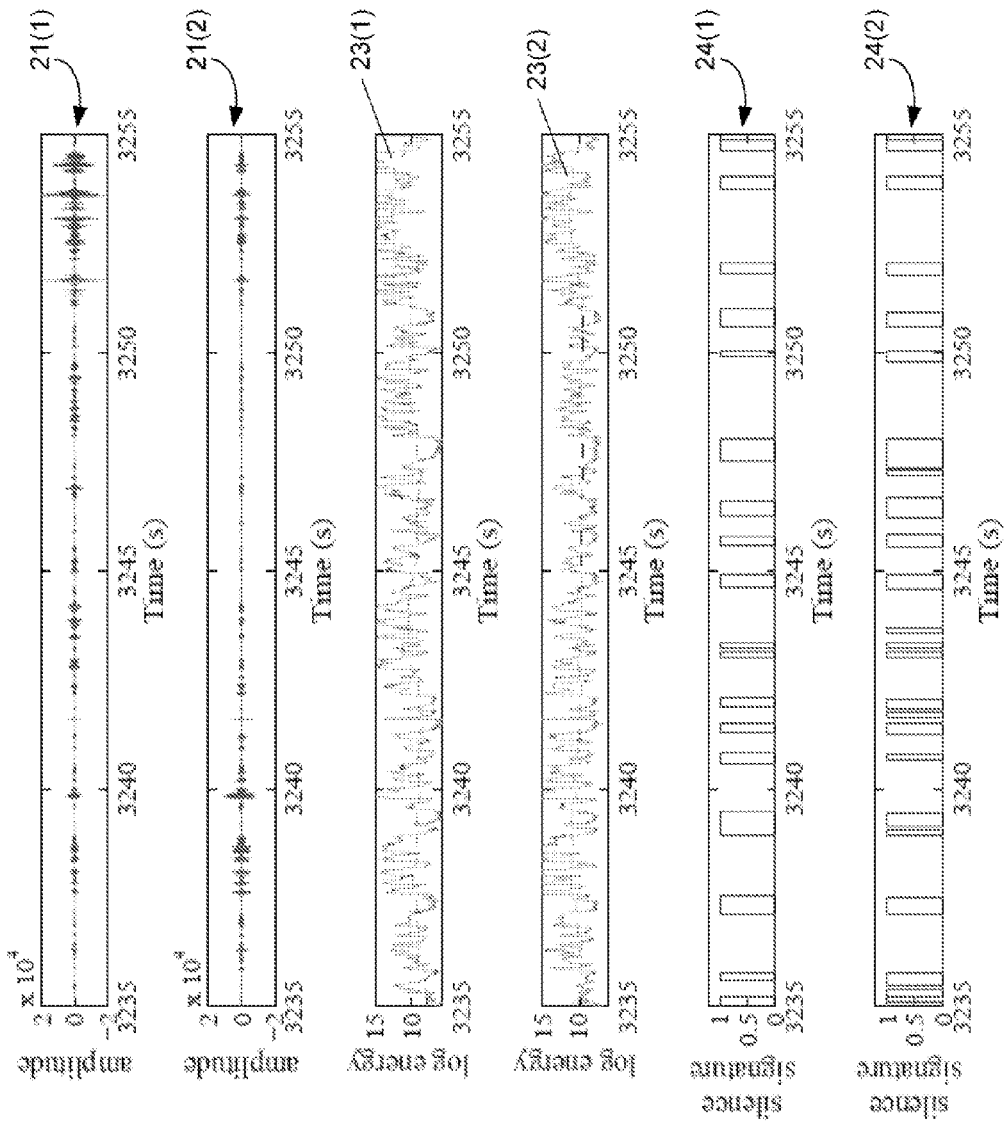
FIG. 4 illustrates a plurality of graphs showing an example of a transformation of audio signals into silence signatures using a dynamic silence threshold.

The method 200 is described in relation to generating silence signatures for two processing systems. In one example, these are processing systems or devices 15(1) and 15(2) from FIG. 1. In describing the method 200 for generating a silence signature of an audio signal, reference is made to FIG. 4. FIG. 4 illustrates a plurality of graphs showing an example of a transformation of audio signals (i.e., portions of speech) into silence signatures using a dynamic silence threshold based on the energy level of the audio signals.

The method 200 begins at step 205 where the signature generators 20(1) and 20(2) filter the audio signals 22(1) and 22(2) and remove selected frequencies from the audio signal. In one example, the audio signals are filtered with a high pass filter to remove potential low frequency noise. In another example, filtering is performed to remove frequencies suppressed by typical audio compression methods for teleconference. The top two graphs in FIG. 4 illustrate two comparison windows 21(1) and 21(2) of the audio signals 22(1) and 22(2) recorded by the two different devices 15(1) and 15(2). Due to different relative distances between the devices and the people who are speaking, the relative amplitude of the signals shown in top graphs of FIG. 4 can be very different. This suggests that direct methods, such as simple correlation of the audio signals, may not be completely reliable in determining similarity of the audio signals.

In one example, the comparison windows 21(1) and 21(2) of the audio signals 22(1) and 22(2) are twenty seconds long, but it is to be understood that comparison windows can be of different length. As explained in additional detail below, the comparison windows can be fixed-length windows or adaptive comparison windows. The comparison windows shown in FIG. 4 and described in relation to the method 200 are fixed-length windows.

The proposed method 200 is based on using the energy level (i.e., the energy of the speech) in the audio signals to continuously determine at least one dynamic silence threshold. The dynamic silence threshold is then used to quantize the comparison windows of the audio signals to non-speech or silence values and non-silence or sound values in order to generate the silence signatures. The method takes in consideration the surrounding environment or location of every participant or device (i.e., the recorded speech and the ambient noise level) and adjusts the dynamic threshold based on these characteristics.

The ambient noise level of any recorded environment can change over time. Even if the ambient noise level does not change, many wireless devices apply adaptive gain control to their microphones, and this causes the recording energy to vary over time. To address the change in ambient noise level over time, the proposed method 200 calculates a dynamic silence threshold that varies over time using a predetermined time window within the audio signal. The dynamic silence threshold represents the level of expected ambience noise during the predetermined window within the audio signal and is used to separate speech from non-speech.

The method 200 separates the comparison windows 21(1) and 21(2) of the audio signals into a plurality of small time intervals. In one example, the time intervals are ten milliseconds (10 ms), but time intervals of a different length can also be used. In step 210, the signature generators 20(1) and 20(2) compute an energy value for each of a plurality of time intervals of the comparison windows. In one example, this computed energy value is the log-energy (i.e., the energy on a logarithmic scale, not a linear scale). The energy value of the 10 ms time intervals is used to compute at least one dynamic threshold for the time intervals.

In step 215, the signature generators determine at least a minimum energy value $m_i$ and an average energy $a_i$ value for each of the plurality of time intervals during a predetermined time window of 10 ms time intervals in the audio signal. In one example, the predetermined time window used to calculate the dynamic threshold for each small time interval is two seconds. The signature generators may use one second of the audio signal before each particular 10 ms time interval and one second after each 10 ms time interval. In other examples, predetermined time windows of a different length can also be used.

In one example, the dynamic threshold for each 10 ms time interval is an intermediate value between the minimum energy value $m_i$ and the average energy value $a_i$. At step 220, the signature generators compute at least one dynamic silence threshold for each 10 ms time interval using at least the minimum energy value and the average energy value. For example, the threshold can be a value that is closer to the average energy value than the smallest energy value. In that case, the dynamic silence threshold is not skewed by a few large values in the two second predetermined time window. In other examples, the dynamic threshold may be computed by using different values (e.g., a maximum energy value, etc.) or combination of values and the dynamic threshold may be closer to the minimum energy value or to a maximum energy value.

In step 225, the signature generators adjust the at least one dynamic silence threshold at a predetermined decibel value above the minimum energy value. In one example, the silence threshold is adjusted upward with two decibels (dB). In other examples, the silence threshold can be adjusted by a different value (e.g., 0.7 dB, 0.8 dB, etc.) and the value may not be predetermined. The goal of adjusting the silence threshold is to address situations where there is not "enough" speech in the audio signals. In other words, when the average energy value $a_i$ for the predetermined time window is very close to the minimum energy value $m_i$, the energy values of the plurality of time intervals will only fluctuate a little and the derived silence threshold will provide an incorrect classification. Therefore, the silence threshold must be at least some value (e.g., 2 dB, etc.) above the softest noise (i.e., the minimum energy value $m_i$) in the two second predetermined window to be considered significant. On the other hand, when the average energy value $a_i$ for the predetermined time window is not close to the minimum energy value $m_i$, the silence threshold needs to be adjusted with a smaller decibel value (e.g., 0.7 dB). This step helps to effectively ignore small wiggles in the audio signal, and is functional in practice, since people generally try to speak loud enough to be heard. Therefore, the generated silence threshold dynamically adapts to changes in the ambient noise level.

The following formula represents one example of a method for calculating a dynamic threshold for each time interval in the predetermined window of the audio signal.

$$T_i = m_i + \max[X, Y \times (a_i - m_i)]$$

Where $T_i$ is the silence threshold for each time interval, $m_i$ is the minimum energy value, a is the average energy value $a_i$ max is a selection function that determines how much to adjust the $T_i$. The selection function evaluates the difference between $a_i$ and $m_i$ and based on the result adjusts the threshold at a predetermined decibel value above the minimum energy value as described above. In equation 1, value X can be 2 dB and value Y can be 0.7 dB.

The determined silence threshold is for one 10 ms time interval of the audio signal. For the next 10 ms time interval, the signature generators calculate a new dynamic silence threshold using a new two second time window shifted by one 10 ms interval. The middle two graphs of FIG. 4 illustrate the energy of the speech in the audio signals over a plurality of time intervals on a logarithmic scale. The dashed lines 23(1) and 23(2) in FIG. 4 represent the dynamic silence thresholds for these audio signals. As explained below, the energy value of each time interval is compared to the silence threshold to quantize the audio signal into silence and speech. Therefore, the method 400 uses the energy the energy level of the audio signals to generate silence signatures of the audio signals.

In another example (not shown), the signature generator can calculate more than one threshold for each time interval in the audio signal. In that situation, the energy value of each time interval is compared to at least two silence thresholds. For example, a first threshold may be used to determine a sound (e.g., when the energy value of the time interval is above the first threshold) and a second threshold may be used to determine silence (e.g., when the energy value of the time interval is below the second threshold). The first and the second thresholds are not the same. In this example, there may be in intermediate or uncertainty value for the time interval when the energy value of the time interval is between the first threshold (e.g., sound) and the second threshold (e.g., silence).

Next, in step 230 of the method 200, the signature generators 20(1) and 20(2) quantize each time interval (e.g., 10 ms) of the audio signals into a value based on the at least one dynamic silence threshold (e.g., $T_i$) for each time interval. In one example, the value of each time interval includes at least a silence value (i.e., non-speech) or a sound value (i.e., non-silence). For instance, each time interval having an energy value above the at least one dynamic silence threshold is quantized with a sound value and each time interval having an energy value below the same dynamic silence threshold is quantized with a silence value. In addition, the signature generators 20(1) and 20(2) remove all silences that have a duration that is less than 100 ms from the audio signal.

In other examples (i.e., when there are at least two silence thresholds for each time interval), the signature generators 20(1) and 20(2) quantize each time interval of the audio signals into a value based on the at least two dynamic silence thresholds. For instance, each time interval having an energy value above a first dynamic silence threshold is quantized with a sound value and each time interval having an energy value below a second dynamic silence threshold is quantized with a silence value. As mentioned above, a time interval may also be quantized with an intermediate or uncertainty value when the energy value of the time interval is between the first silence threshold and the second silence threshold.

In step 235, each of the signature generators 20(1) and 20(2) generate silence signatures 24(1) and 24(2) for comparison windows 21(1) and 21(2) of the audio signals. The silence signatures 24(1) and 24(2) are illustrated in the last two graphs of FIG. 4. In one example, the silence signatures 24(1) and 24(2) indicate silence with a 1 and speech with a 0 (a shown in FIG. 1). In other examples, different indication values may be assigned for silence and sound. The method 200 ends with moving to step 115 of method 100—providing the silence signatures to the interaction service 30. The silence signature can be submitted with or without compression.

Figure 5:
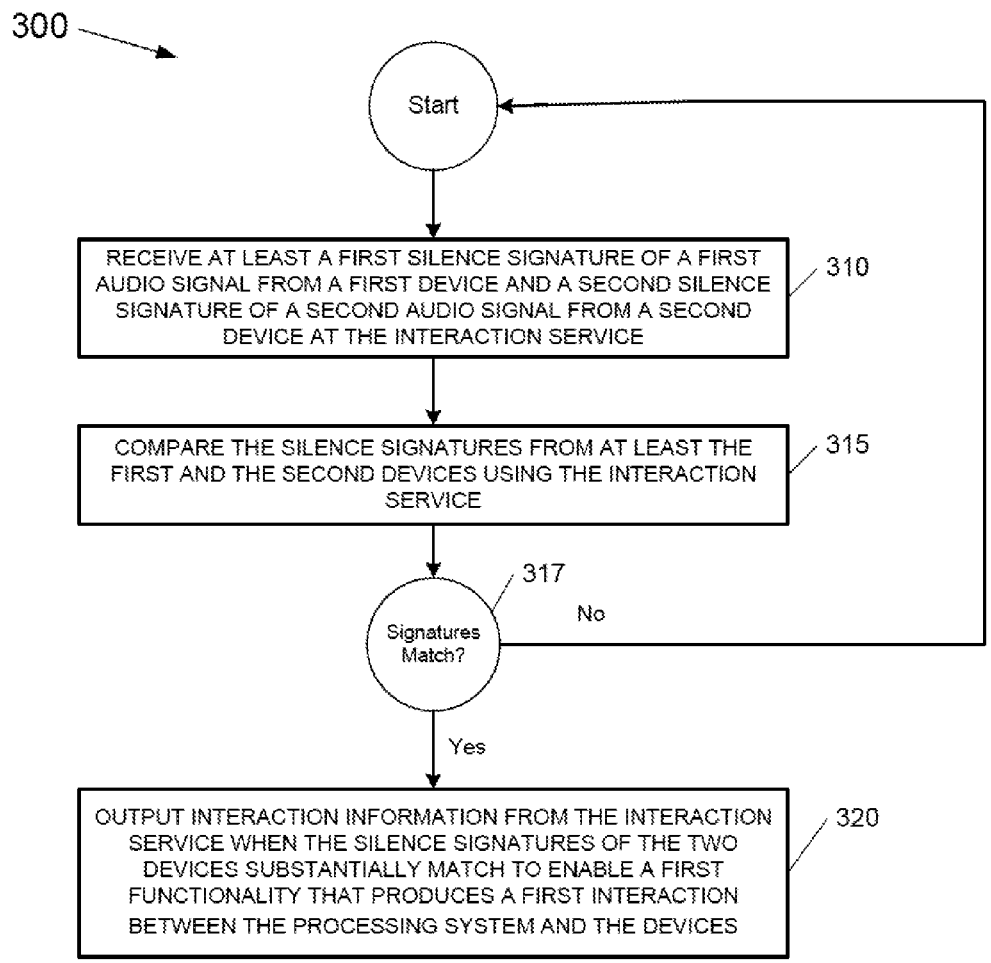
FIG. 5 illustrates a flow chart showing an example of a process for comparing silence signatures of at least two devices and outputting interaction information corresponding to the at least two devices to enable a functionality.

After a silence signature of an audio signal is provided to the interaction service 30, the interaction service outputs interaction information corresponding to the device (see step 120 of method 100). The interaction service 30 may receive silence signatures from a plurality of processing systems or devices. FIG. 5 illustrates an example of a process 300 for comparing silence signatures of at least two devices and outputting interaction information corresponding to the at least two devices to enable a functionality. The process 300 may be executed in the form of instructions encoded on a non-transitory machine-readable storage medium executable by a processor of a processing system. In one example, process 300 is performed by the interaction service 30. As noted earlier, the interaction service 30 may be stored on a machine-readable storage medium of an independent computing device or on a machine-readable storage medium of the one of the processing systems or devices 15(1) . . . 15(M).

In one example, the machine machine-readable storage medium includes instructions to receive at least a first silence signature of a first audio signal from a first device and a second silence signature of a second audio signal from a second device at the interaction service 30 (at step 310). The silence signatures of the audio signals are generated as described in the method 200 above and are based on the energy level of the audio signals.

Further, the machine machine-readable storage medium includes instructions to compare the silence signatures from at least the first and the second devices using the interaction service 30 (at step 315). There are various different methods of comparing the silence signatures of the devices. These methods may depend on whether the silence signatures are generated over a fixed comparison window (e.g., 15, 20 seconds, etc.) or an adaptive comparison window.

In one example, when the silence signatures are generated over a fixed comparison window, the interaction service 30 uses silence based methods to determine whether there are any similarities between the silence signatures. Given silence signatures s0 and s1, a similarity measure between 0 and 1 provides a value close to 1 for co-located s0 and s1 and a value close to 0 for unrelated s0 and s1.

The interaction service 30 can use the Jaccard's similarity coefficient to evaluate the ratio of matching silence over times that are considered as silent in the two silence signatures. An example formula for determining similarities by using the Jaccard's method is shown below:

$$J(s_0, s_1) = \frac{|s_0 \cap s_1|}{|s_0 \cup s_1|}$$

Further, the interaction service may use a cosine similarity metric to determine whether the signatures match:

$$C(s_0, s_1) = \frac{(s_0 - \hat{s}_0)}{|s_0 - \hat{s}_0|} \cdot \frac{(s_1 - \hat{s}_1)}{|s_1 - \hat{s}_1|}$$

where s0 and s1 are treaded as vectors with scalar means ŝ0 and ŝ1, respectively, and the dot represents the vector dot-product. When s0 and s1 are unrelated, C(s0; s1) is close to zero, but when s0 and 51 are from the same time and place, C(s0; S1) is close to one. Geometrically, C is the cosine of the angle between vectors s0-ŝ0 and s1-ŝ1 and has a range of [−1 1]. An affine transform can remap the cosine into the required range [0 1] to result in the cosine similarity measure S used by the interaction device:

$$S(s_0, s_1) = \frac{1}{2}[1 + C(s_0, s_1)]$$

Alternatively, the interaction service 30 may use a sample-wise correlation and can directly compare audio samples to determine similarity. Due to differences in the recording hardware of the devices and the distance of the devices from the sounds they record, it is sometimes difficult to identify true matches using this method.

Figure 6:
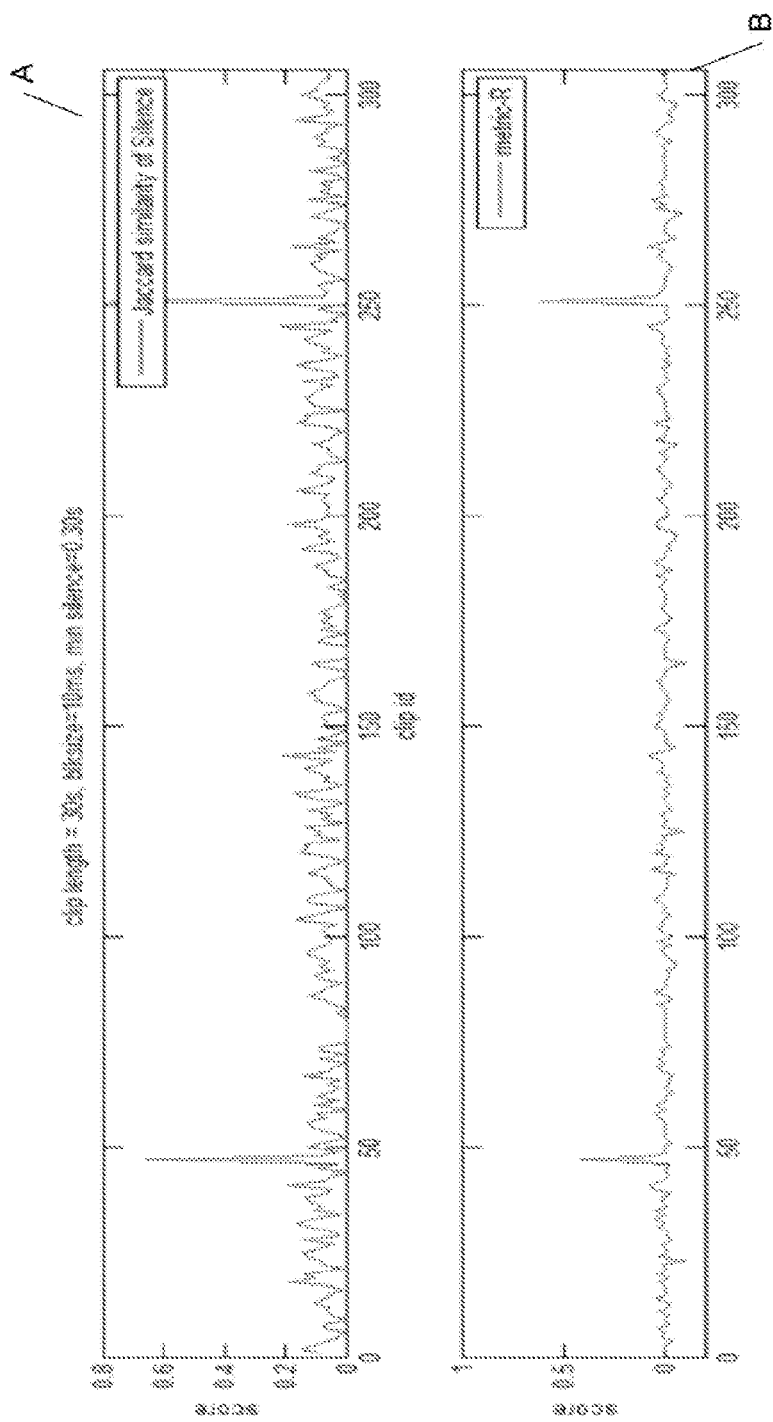
FIG. 6 illustrates graphs showing an example of two silence based methods for determining similarities between silence signatures.

FIG. 6 illustrates two graphs showing an example of the two silence based methods for determining similarities between silence signatures. In the illustrated example, the fixed comparison window of the audio signal is 30 seconds. Graph A represents an evaluation suing the Jaccard's similarity coefficient and graph B is an evaluation using the cosine similarity metric. In these examples, a 30 second audio signal of user X's recording is compared to 306 audio signals out of which only two, recorded by users Y and Z, are at the same time and have similarities. The y-axis in the graphs A and B shows the similarity score and x-axis represents the index of the 306 clips. As shown in FIG. 6, both silence based methods can successfully determine similarities between the audio signals while rejecting accidental matches.

When the silence signatures are generated over an adaptive comparison window, the interaction service 30 uses thresholds based on past decisions to determine similarities between the silence signatures. In one example, the interaction service 30 stores in a memory past silence signatures of a sequence of window sizes $w0<w1<w2<w3 \ldots wM$ for every processing system or device. The interaction service 30 can extract the most recent segment corresponding to each of those window sizes for comparison. In order to determine whether two signatures match, the interaction service 30 first compares their audio signatures over a window $w0$. If the comparison score is high, the interaction service 30 declares a match. If the score is low, the interaction service 30 declares no match. If the score is intermediate, the interaction service 30 repeats the comparison using a larger window $w1$.

In one example, the interaction service 30 identifies a last window $wM$. If the comparison between the signatures reaches the last window $wM$, the interaction service 30 forces a decision to be made at that point. For each window size $wi$, the interaction service 30 identifies a corresponding high threshold $Hi$ and a low threshold $Li$ to determine a match and no match between the signatures. In one examples, the thresholds $Hi$ and $Li$ are not the same for a different $i$. In other examples, these thresholds may be the same. The thresholds $Hi$ and $Li$ can be determined by using a number of factors, including the acceptable misclassification rate and earlier classification results (e.g., when is known whether the two devices previously have matching signatures).

After the comparison of the silence signatures by the two devices, the machine machine-readable storage medium includes instructions to determine whether the signatures match (at step 317). If the silence signatures from the two devices do not match, the process returns to the starting point. When the silence signatures of the two devices substantially match, the machine-readable storage medium includes instructions to output interaction information corresponding to the first and the second device from the interaction service 30 to enable a functionality that produces an interaction between the processing system and the devices (at step 320). This interaction can include interaction between the two devices or interaction between the devices and the processing system.

As previously noted, the interaction information can include IP addresses of the devices, email address associated with the users, locations of the devices, contact information of the users, content associated with the devices, links to websites, and any other suitable information related to the devices, their software or the people using them. The functionality enabled by the interaction information may include determining co-location of the devices and their users and forming sharing or meeting groups between the users.

Figure 7:
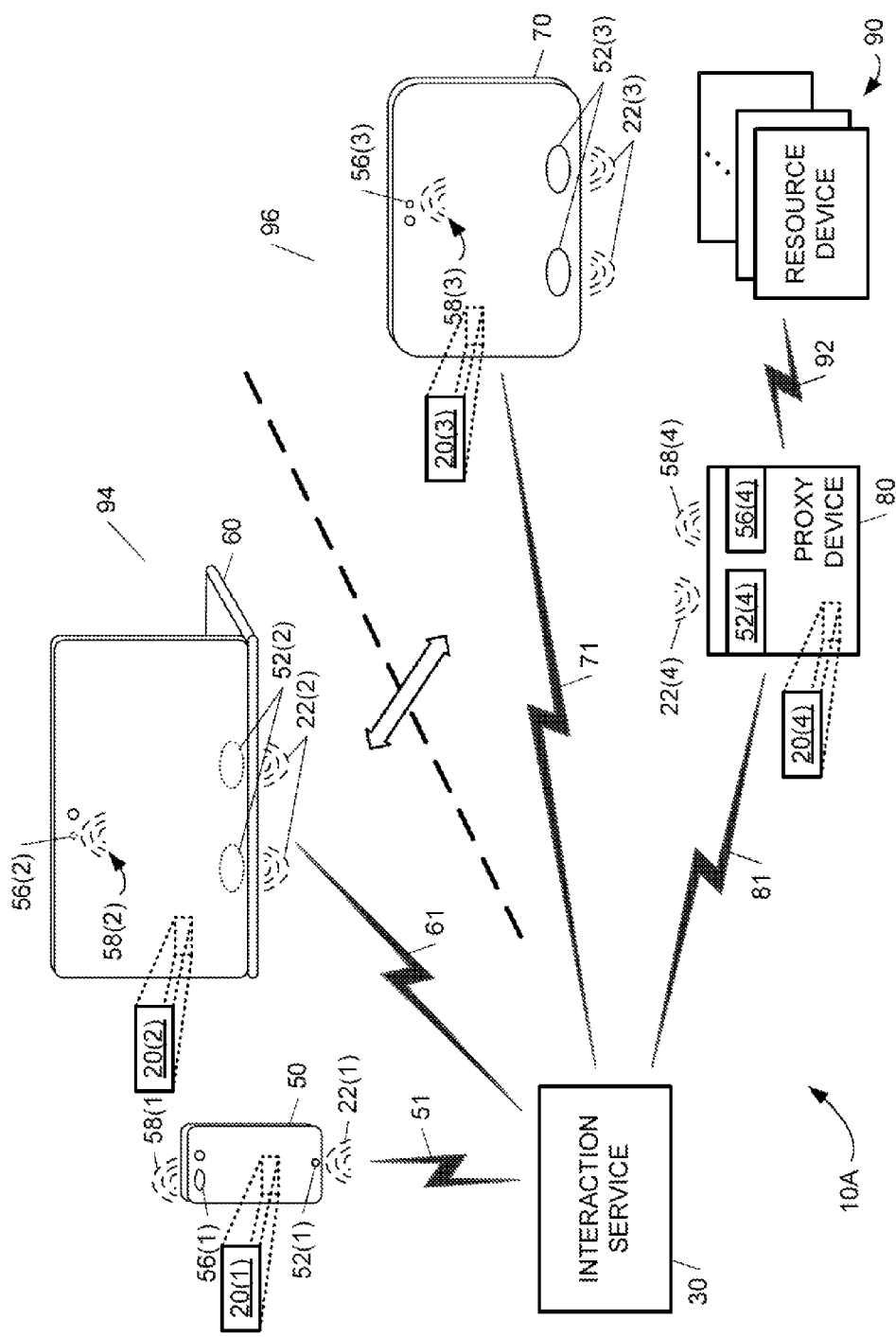
FIG. 7 is a schematic diagram illustrating an example of a processing environment with a processing system and a plurality of devices.

FIG. 7 is a schematic diagram illustrating an example of a processing environment 10A with a processing system or interaction service 30 that evaluates a plurality of silence signatures of audio signals generated by a plurality of devices, establishes an interconnection between the plurality of devices when the silence signatures of the devices substantially match, and terminates the interconnection between at least one of the devices and the plurality of devices when the silence signature of the at least one device no longer substantially matches the silence signature of the plurality of devices.

The processing environment 10A may include any number of processing systems or devices. The processing environment 10A, the interaction system 30, and the devices shown in FIG. 7 have the same characteristics as the processing environment, system, and devices shown in FIG. 1. In the illustrated example, the interaction service 30 operates as a processing system and is connected to a smartphone 50, a laptop 60, a tablet 70, and a proxy device 80 via network connections 51, 61, 71, and 81 respectively. The proxy device 80 is connected to a resource device 90 via a network connection 92. The network connection include any suitable type, number, and/or configuration of network and or port devices or connections configured to allow a communication between the processing system 30 and devices 50, 60, 70, 80, and 90. The smartphone 50 and the laptop 60 are positioned at a location 94 and the tablet 70, the proxy device 80, and the resource device 90 are positioned at a location 96. The locations 94 and 96 are different and can represent two conference rooms in the same building, offices in Europe and in Asia, or any other variations of physical locations.

The following paragraphs will primarily describe the operation of environment 10A from the perspective of processing system or interaction service 30. The functions described with reference to processing system 30 may also be performed by devices 50, 60, 70, and 90. Alternatively to being an independent component, the processing system 30 can be included in any of the illustrated devices. As used herein, the terms processing system and device are used interchangeably such and the type and arrangement of the devices as shown in FIG. 7 is only shown one example.

The devices 50, 60, 70, and 80 include signature generators 20(1)-20(4), microphones 52(1)-52(4) recording audio signals 22(1)-(22), and audio-output devices (e.g., speakers) 56(1)-56(4) emitting sound signals 58(1)-58(4). The resource device 90 represents any type of infrastructure device (e.g., a projector, printer, display, etc.) that does not have a microphone and cannot independently generate a silence signature to establish co-location and to create interconnection with other devices.

The proxy device 80 can be any suitable proxy device that operates to identify infrastructure devices in the same location (e.g., through automatic discovery mechanisms or manual configuration), to capture audio with its microphone 52(4), and to generate a silence signature using the signature generator 20(4) or a signature generator located in another device. Further, the proxy device 80 operates to provide the silence signature related to any infrastructure device to the interaction service 30 to determine co-location and establish interconnection between the infrastructure device and other devices, and to control the infrastructure devices via a network connection 92 (e.g., to project, display, or print content when other interconnected users/devices share the content).

Figure 8:
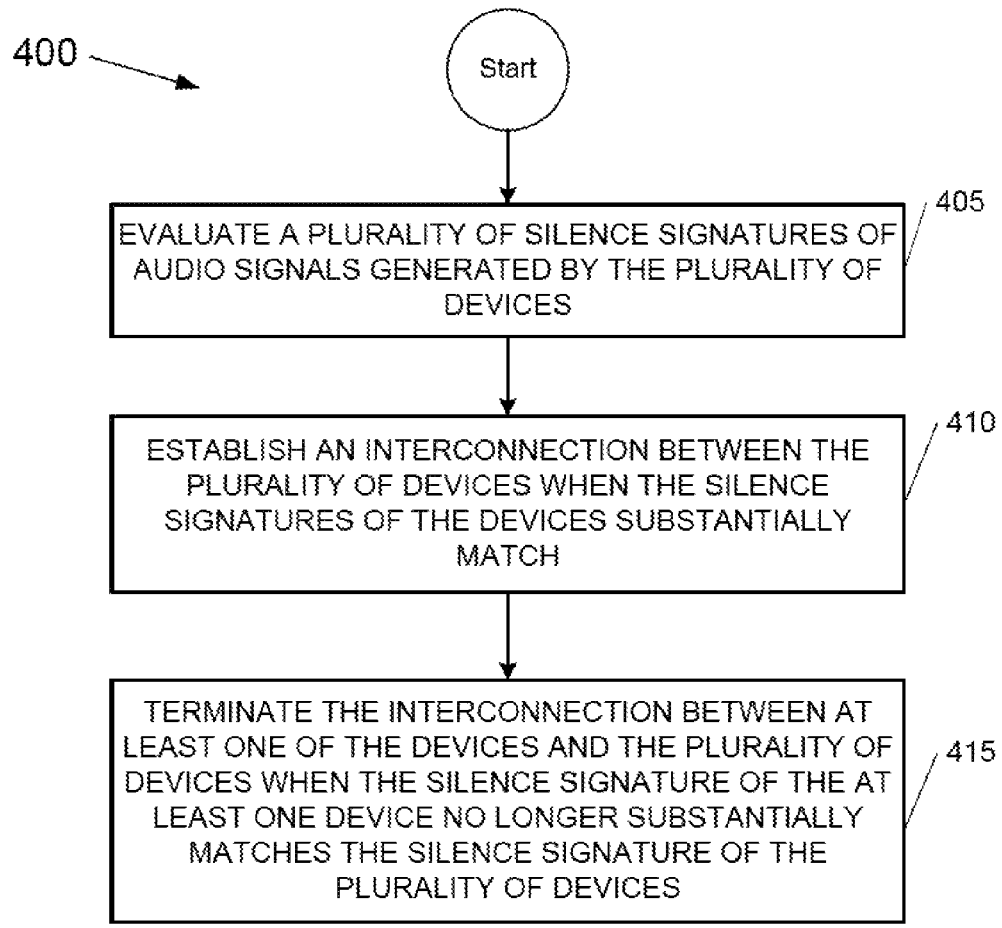
FIG. 8 illustrates a flow chart showing an example of a method for establishing and terminating an interconnection between a plurality of devices.

FIG. 8 illustrates a flow chart showing an example of a method 400 for establishing and terminating an interconnection between a plurality of devices. The method 400 can be executed by a processor of the processing system 30. Various steps described herein with respect to the method 400 are capable of being executed simultaneously, in parallel, or in an order that differs from the illustrated serial manner of execution. The method 400 is also capable of being executed using additional or fewer steps than are shown in the illustrated example.

The method 400 begins in step 405, where the interaction service 30 evaluates a plurality of silence signatures of audio signals generated by the plurality of devices 50, 60, 70, and 80. The silence signatures are based on the energy level of the audio signals and on a dynamic silence threshold and are generated by using the methods described above. Devices 50, 60, 70, and 80 send the silence signatures to the interaction service 30 via network connections 51, 61, 71, and 81. Since the resource device 90 is unable to generate a silence signature on its own, the proxy device 80 generates a silence signature that is representative of the location (i.e., the audio environment) of the resource device. In one example, the devices may continuously capture audio and transmit silence signatures. Also, a user of a device may explicitly indicate that is in a conference or a meeting in order the device to generate a silence signature. Alternatively, the device can periodically test for speech (e.g., turn the microphone on predetermined time intervals) and only generate silence signatures when detects voices.

The interaction service 30 uses the methods described above to evaluate and compare the silence signatures from the different devices. As noted above, these methods may depend on whether the silence signatures are generated over a fixed comparison window or an adaptive comparison window. If the interaction service 30 determines that the silence signatures of the devices substantially match, the interaction service 30 establishes an interconnection between the devices (at step 410). Because the silence signatures are audio representation of the location of the devices, when these signatures match, the interaction service 30 determines that the devices have the same co-location (e.g., physical or virtual). In one example, the interaction service 30 establishes interconnection (e.g., forms a sharing group between the devices) between devices that are already connected with each other, by using some type of interaction information outputted by the interaction service 30. In another example (i.e., when the devices are not connected at all), the interaction service 30 establishes interconnection between the devices for the first time.

In is not necessary that the silence signatures of all devices match to establish an interconnection between the devices (although that is possible). In one example, only the silence signatures of the smartphone 50, the tablet 70, and the resource device (i.e., via the proxy device 80) may match. In that example, interconnection may be formed only between these devices. Further, the proxy device 80 operates to provide a silence signature for any the resource devices 90 to the interaction service 30 to and to establish interconnection between the resource device 90 and other devices when their signatures match.

One way to establish interconnection between the devices is to operate the interaction service 30 to send the IP addresses of all signature matching devices to all members of the group. That way, a sharing group may be established between devices that are in different locations (e.g., 96 and 96). Alternatively, when a meeting involves only one physical location, additional mechanisms for establishing interconnections and forming groups are possible. For example, one main device from a group of devices sharing the same location can broadcast its signature in the local network to all other devices in the network, including to a device that outside the physical location but still in the network. In that situation each device may evaluate its own silence signature versus the received silence signatures from other device. Devices finding a match between the received signature and their own signature can contact the other device directly to form sharing groups. The device that is outside the physical location is required to send its subsequent signature to the main for validation before receiving access to the group.

When the silence signature of the at least one device no longer substantially matches the silence signature of the plurality of devices the interaction service 30 terminates the interconnection between the at least one of the devices and the plurality of devices (at step 415). In one example, the interaction service 30 continuously evaluates the silence signatures of the devices to validate whether the devices (i.e., the group participants associated with the devices) are still in the sharing group or a meeting. When interaction service 30 determines that device is no longer in the meeting (e.g., the person carrying the smartphone 50 left the room), the interaction service 30 terminates the interconnection between that device and the other devices. The interaction service 30 may automatically notify the other devices that the silence signature of a particular device is no longer valid. Further, for security or other reasons, the interaction service 30 may terminate the interconnection between a device and the other devices when specifically required by a user, even if that device can be interconnected with the other devices.

One issue in establishing interconnection between devices may occur when the audio signal used to generate a silence signature of a device is generated from a completely silent acoustic environment. An assumption for the successful implementation of the methods described above is that the comparison window of the audio signal being evaluated contains some uniquely identifiable events (speech, etc.). For example, devices 50, 60, 70, and 80 may be interconnected in a meeting but during a break the interaction service 30 may no longer be able to reliably determine that device 50 is co-located with device 60 but not with device 70. In order to solve this issue, each of the plurality of devices 50, 60, 70, and 80 is operable to emit a sound signal 58(1)-58(4) (e.g., by using the speakers 56(1)-56(4)) at a predetermined time interval after a period of silence (e.g., 1 minute, 5, 10 minutes, etc.) when interconnection is established between the plurality of devices. In one example, only one of the devices 50, 60, 70, or 80 emits a sound signal. The rest of the devices can "hear" that sound and can send matching silence signatures to the interaction service 30 to establish co-location of the devices.

In one example, every device 50, 60, 70, and 80 may have a different predetermined time interval or threshold for emitting a sound signal. That will avoid a situation where all devices in a silent room emit a sound at the same time. In addition, to reduce the chance of random match, it is desirable that the emitted by each sound be unique. For example, if audio phases are being compared, then the emitted sound can have a random phase. Further, the emitted sounds can also have an embedded message (e.g., the name of the device emitting the sound, etc.).

Figure 9:
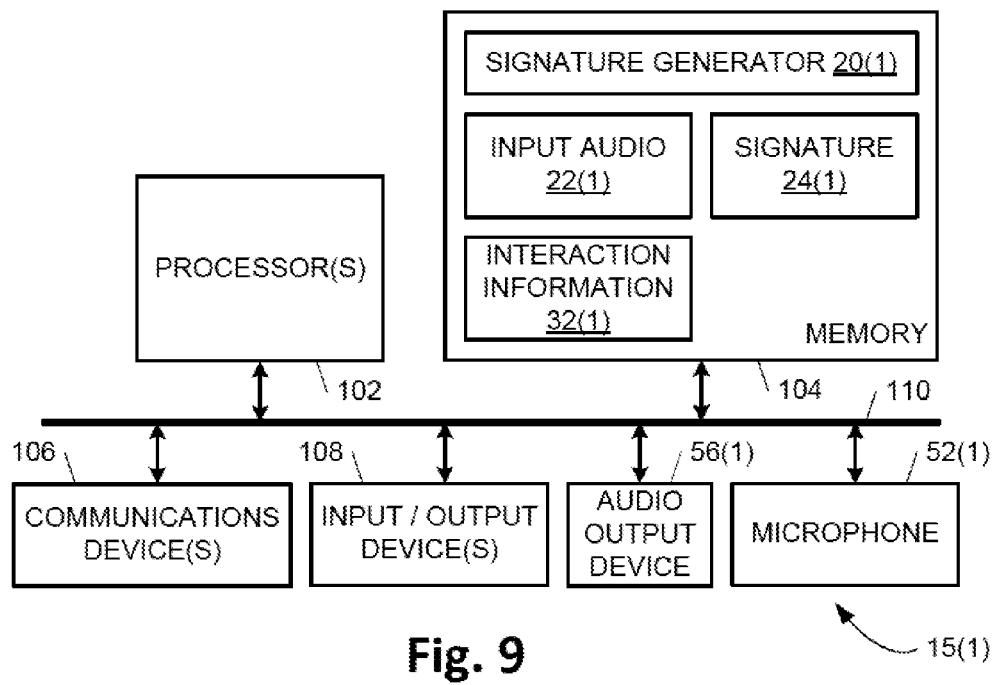
FIG. 9 is a block diagram illustrating an example of additional details of the processing system of FIG. 1 that implements a signature generator.

FIG. 9 is a block diagram illustrating an example of additional details of the processing system 15(1) that implements a signature generator 20(1) to perform the functions described above. In addition to camera 52(1), audio-output device 56(1), the processing system 15(1) includes at least one processor 102 configured to execute a set of instructions stored in a memory system 104, at least one communications device 106, and at least one input/output device 108. Processor 102, memory system 104, communications devices 106, and input output devices 108 communicate using a set of interconnections 101 that includes any suitable type, number, and or configuration of controllers, buses, interfaces, and/or other wired or wireless connections.

The processor 102 is configured to access and execute instructions stored in memory system 104 and to access and store data in memory system 104. Memory system 104 includes any suitable type, number, and configuration of volatile or non-volatile machine-readable storage media configured to store instructions and data. Examples of machine-readable storage media in memory system 104 include hard disk drives, random access memory (RAM), read only memory (ROM), flash memory drives and cards, and other suitable types of magnetic and or optical disks.

The memory system 104 stores the signature generator 20(1), the input audio signal 22(1) from the microphone 52(1), the generated silence signature 24(1), and interaction information 32(1) for the processing system or device 15(1). As explained above, the signature generator 20(1) includes instructions that, when executed by processor 102, causes processor 102 to perform the functions described above including generating a silence signature for the device based on the input audio signal.

The communications devices 106 include any suitable type, number, and/or configuration of communications devices configured to allow processing system 15(1) to communicate across wired or wireless networks.

The input/output devices 108 include any suitable type, number, and/or configuration of input/output devices configured to allow a user to provide information to and receive information from processing system 15(1) (e.g., a touchscreen, a touchpad, a mouse, buttons, switches, and a keyboard).

Figure 10:
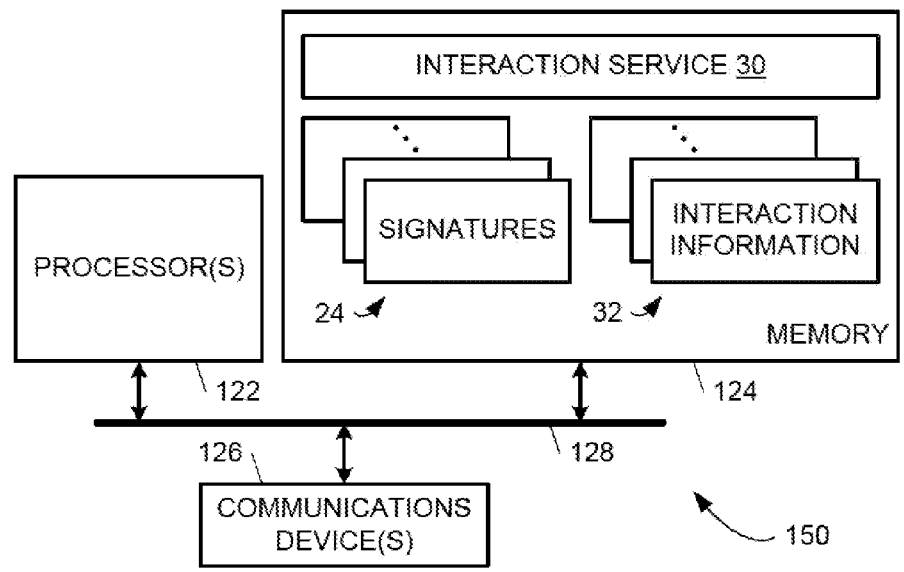
FIG. 10 is a block diagram illustrating an example of a processing system for implementing the interaction service.

FIG. 10 is a block diagram illustrating an example of a processing system 150 for implementing the interaction service 30. It is to be understood that the interaction service 30 may also be implemented by any of the processing systems or devices 15. The processing system 150 includes at least one processor 122 configured to execute a set of instructions stored in a memory system 124, and at least one communications device 126. Processor 122, memory system 124, and communications devices 126 communicate using a set of interconnections 128 that includes any suitable type, number, and/or configuration of controllers, buses, interfaces, and or other wired or wireless connections.

The processor 122 is configured to access and execute instructions stored in memory system 124 and to access and store data in memory system 124. The memory system 124 includes any suitable type, number, and configuration of volatile or non-transitory machine-readable storage media configured to store instructions and data. Examples of machine-readable storage media in the memory 124 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, hard disk, an SD card, and other suitable magnetic, optical, physical, or electronic memory devices.

The memory system 124 stores interaction service 30, a plurality of silence signatures 24 from a plurality of devices, and interaction information 32 from the corresponding to the plurality of devices. The interaction service 30 includes instructions that, when executed by processor 122, causes processor 122 to perform the functions described above including evaluating the plurality of silence signatures 24 of audio signals generated by the plurality of devices 15, establishing an interconnection between the plurality of devices when the silence signatures of the devices substantially match, and terminating the interconnection between at least one of the devices and the plurality of devices when the silence signature of the at least one device no longer substantially matches the silence signature of the plurality of devices.

The communications devices 126 include any suitable type, number, and/or configuration of communications devices configured to allow processing system 150 to communicate across wired or wireless networks.

What is claimed is:

1. A method performed by a processing system, the method comprising:
   generating a silence signature of an audio signal from a device based on an energy level of the audio signal, wherein generating the silence signature of the audio signal further includes computing a dynamic silence threshold, comprising:
      computing an energy value for each of a plurality of time intervals of the audio signal;
      determining at least a minimum energy value and an average energy value for each of the plurality of time intervals during a predetermined time window of the audio signal; and
      computing at least one dynamic silence threshold for each time interval using at least the minimum energy value and the average energy value;
   providing the silence signature to an interaction service using a network connection; and
   outputting interaction information corresponding to the device from the interaction service.

2. The method of claim 1, further comprising adjusting the at least one dynamic silence threshold at a predetermined decibel value above the minimum energy value.

3. The method of claim 1, wherein generating the silence signature of the audio signal further includes quantizing each time interval of the audio signal into a value based on the at least one dynamic silence threshold for each time interval, wherein the value includes at least a silence value or a sound value.

4. The method of claim 3, wherein each time interval having an energy value above the at least one dynamic silence threshold is quantized with a sound value and each time interval having an energy value below the same dynamic silence threshold is quantized with a silence value.

5. The method of claim 3, wherein each time interval having an energy value above a first dynamic silence threshold is quantized with a sound value and each time interval having an energy value below a second dynamic silence threshold is quantized with a silence value, where the first and the second dynamic thresholds are not the same.

6. The method of claim 1, wherein generating the silence signature of the audio signal further includes filtering the audio signal and removing selected frequencies from the audio signal.

7. A non-transitory machine-readable storage medium encoded with instructions executable by a processor of a processing system, the machine-readable storage medium comprising instructions to:
   receive at least a first silence signature of a first audio signal from a first device and a second silence signature of a second audio signal from a second device, where the silence signatures are based on energy levels of the audio signals;

compare the silence signatures from at least the first and the second device using an interaction service; and output interaction information corresponding to the first and the second device from the interaction service when the silence signatures of the two devices substantially match to enable a functionality that produces an interaction between the processing system and the devices, wherein the first silence signature and the second silence signature are generated over a comparison window of the first and the second audio signals, and wherein the silence signatures for each device are determined by:

computing an energy value for each of a plurality of time intervals of the audio signal;

determining at least a minimum energy value and an average energy value for every energy value of each of the plurality of time intervals during a predetermined time window of the audio signal;

computing at least one dynamic silence threshold for each time interval; and adjusting the at least one dynamic silence threshold at a predetermined decibel value above the minimum energy value.

8. The non-transitory machine-readable storage medium of claim 7, wherein the silence signatures for each device are further determined by quantizing each time interval of the audio signal into a value based on the at least one dynamic silence threshold for each time interval, wherein the value includes at least a silence value or a sound value.

9. The non-transitory machine-readable storage medium of claim 7, wherein the comparison window is an adaptive comparison window.

10. A method performed by a processing system, the method comprising:

determining a plurality of silence signatures generated by a plurality of devices, wherein each silence signature is determined by:

computing an energy value for each of a plurality of time intervals of the audio signal;

determining at least a minimum energy value and an average energy value for every energy value of each of the plurality of time intervals during a predetermined time window of the audio signal;

computing at least one dynamic silence threshold for each time interval; and adjusting the at least one dynamic silence threshold at a predetermined decibel value above the minimum energy value;

evaluating the plurality of silence signatures;

establishing an interconnection between the plurality of devices when the silence signatures of the devices substantially match; and terminating the interconnection between at least one of the devices and the plurality of devices when the silence signature of the at least one device no longer substantially matches the silence signature of the plurality of devices.

11. The method of claim 10, further comprising emitting a sound signal by at least one of the plurality of devices at a predetermined time interval after a period of silence when interconnection is established between the plurality of devices.

12. The method of claim 10, further comprising generating a silence signature by a proxy device connected to at least one device that is unable to generate a silence signature and establishing interconnection between the at least one device that is unable to generate a silence signature and the plurality of devices by using the silence signature generated by the proxy device.

* * * * *

UNITED STATES PATENT AND TRADEMARK OFFICE
CERTIFICATE OF CORRECTION

PATENT NO. : 9,774,743 B2  
APPLICATION NO. : 14/758992  
DATED : September 26, 2017  
INVENTOR(S) : Wai-Tian Tan et al.

It is certified that error appears in the above-identified patent and that said Letters Patent is hereby corrected as shown below:

In the Drawings

Drawing sheet 3 of 9, reference numeral 215, Line 1, delete "AT LEATS" and insert -- AT LEAST --, therefor.

Signed and Sealed this  
Twenty-seventh Day of February, 2018

Andrei Iancu  
*Director of the United States Patent and Trademark Office*